United States Patent Office 3,529,985
Patented Sept. 22, 1970

3,529,985
TITANIUM DIOXIDE PIGMENT AND PROCESS
FOR PRODUCING SAME
Harry C. Jester, Westfield, and Robert S. McNeil, Red
Bank, N.J., assignors to National Lead Company,
New York, N.Y., a corporation of New Jersey
No Drawing. Filed Dec. 26, 1967, Ser. No. 693,087
Int. Cl. B02c *19/06;* C09c *1/36*
U.S. Cl. 106—300
9 Claims

ABSTRACT OF THE DISCLOSURE

The present invention relates to an improved $TiO_2$ pigment for use in coating compositions and more particularly to a double-coated $TiO_2$ pigment which combines both superior optical properties and durability in alkyd, solution vinyl, latex, acrylic and similar coating compositions; and is characterized by $TiO_2$ pigmentary material having two successive coatings thereon of titania and/or alumina wherein the first coating is calcined and hence partially or completely dehydrated and the second coating is simply dried; and to a method for producing the same wherein both the first and second coatings of titania and/or alumina are deposited on a $TiO_2$ pigmentary material by precipitation from aqueous slurries of the pigmentary material and water soluble metal salts of titanium and/or aluminum, the coated and calcined $TiO_2$ being milled both before and after deposition of the second coating.

The term "optical properties" as used herein shall be understood to mean the capacity of the double-coated $TiO_2$ pigment to impart brightness and opacity to pigmented coating compositions; the term "$TiO_2$ pigmentary material" denotes a rutile $TiO_2$ that has been produced at a temperature of at least 700° C. before being double-coated by the process of the invention and may be $TiO_2$ burner discharge i.e. a chloride-base $TiO_2$ recovered from the vapor phase oxidation of $TiCl_4$, or a calcined sulfate-base $TiO_2$; while the "durability" of a pigmented coating composition will be understood to mean retention of its initial gloss in alkyd and acrylics, or tint retention in solution vinyls and acrylic latex, over an extended length of time when subjected to weathering.

BACKGROUND OF THE INVENTION

For years the production of $TiO_2$ pigments has been based on the so-called sulfate process wherein a titaniferous material such as ilmenite ore is digested in concentrated sulfuric acid to form an iron sulfate-titanium sulfate solution which is subsequently cooled to precipitate out the iron sulfate as copperas after which the clarified and concentrated titanium sulfate solution is heated to hydrolyze and precipitate out the hydrous $TiO_2$. The hydrate is then calcined to produce a water insoluble $TiO_2$ pigment either in the form of anatase or rutile, as the case may be, for use in paints, enamels and similar coating compositions.

Goaded by industry's insistent demands for coating compositions having better hiding power, durability, gloss and the like, the pigment industry devised special treatments some of which are applied to the $TiO_2$ hydrate prior to calcination, and some of which are applied subsequent to calcination so as to impart certain desirable properties to the finished pigment. The precalcination conditioning agents are usually compounds of potassium, sodium, zinc, phosphates and the like while post calcination conditioning agents have included small amounts of hydrous metal oxides such as alumina, titania, silica, zirconia and the like.

Although the so-called sulfate-base pigments, both as anatase and rutile $TiO_2$, still constitute the major tonnage of the $TiO_2$ pigment being produced in the world today the production of a pyrogenic or chloride-base $TiO_2$ pigment recovered from the vapor phase reaction of $TiCl_4$ with oxygen is on the ascendancy.

The treatment of chloride-base $TiO_2$ has followed closely that of sulfate-base $TiO_2$ as typified by U.S. 3,203,-818 Rechmann et al., Aug. 31, 1965 wherein a sulfate-base or a chloride-base $TiO_2$ is calcined and then coated with the hydrous oxides of silicon and aluminum in two successive steps with a high temperature drying step between treatments so as to impart photochemical stability to the pigment.

However the paint industry has also been steadily improving its vehicle systems i.e. moving from a linseed oil system to the use of alkyds, solution vinyls, latex and acrylics with the result that more sophisticated treatments are necessary to produce $TiO_2$ pigments capable of imparting both superior optical properties and durability to coating compositions employing these vehicles.

SUMMARY OF THE INVENTION

The present invention relates to a double-coated $TiO_2$ pigment which is designed especially to provide coating compositions, and especially those using alkyd, solution vinyls, latex and acrylic vehicles, with both superior optical properties and durability; and is characterized by $TiO_2$ pigmentary material having two successive coatings thereon of the hydrous oxides of titanium and/or aluminum, the first coating being partially dehydrated and the second coating simply dried, each coating comprising from none to 1% titania and from 1% to 4% alumina on a $TiO_2$ weight basis. The invention also includes a novel process for producing the double-coated $TiO_2$ pigment wherein after precipitation of the first coating of titania and/or alumina on the pigment the coated pigment is calcined i.e., heated to a temperature of at least 450° C. to at least partially dehydrate the first coating. The calcined pigment is then milled and a second coating of titania and/or alumina is applied, the second coating being simply dried after which the double-coated pigment is given a final milling.

As defined above the terms "calcination" or "calcined" shall have reference to a temperature sufficiently high i.e. at least about 450° C. to as high as 800° C. and preferably about 700° C. to partially or completely dehydrate the hydrous metal oxide coating; while "drying" has reference to heating to a temperature below 250° C. and preferably about 120° C.

The practice of coating $TiO_2$ pigmentary material with two successive coatings of hydrous metal oxides with an intermediate heat treatment is well known and, as disclosed in Rechmann et al., supra, has been found to enhance the durability of the pigmented coating compositions. However unfortunately this improvement in durability is accomplished by a serious loss in brightness and opacity which have been traced to the presence of the calcined silica on the pigment.

A modification of Rechmann et al.'s double treatment is disclosed in the South African Patent 63/5,042 of British Titan Products Co., Ltd. wherein $TiO_2$ may be coated with alumina and titania in two successive coating steps with a drying step i.e. heating to a temperature below about 250° C. between successive coatings. The double-coated pigment is alleged to have improved durability. It has been found however that when used in various coating compositions i.e. alkyd and acrylic vehicles the durability of the coating is much inferior to that obtained by the improved double-coated pigment of this invention.

It has now been discovered that coating compositions can be made having both superior optical properties and durability provided the $TiO_2$ is given two successive coatings of titania and/or alumina with a calcination step followed by milling between successive coatings and a final relatively intense milling step.

DESCRIPTION OF THE PREFERRED EMBODIMENT

The preferred process for producing the improved double-coated $TiO_2$ pigment of this invention is that now being used to produce pigment on a plant scale in which the starting material is a pyrogenic rutile $TiO_2$ pigmentary material recovered as burner discharge in the vapor phase oxidation of $TiCl_4$. As burner discharge this $TiO_2$ has the potential, by standard treatments, of producing a finished pigment having a tinctoral strength of at least 1790. This $TiO_2$ burner discharge, without previous treatment is first added to water to form an aqueous slurry which is heated to about 60° C. and its pH adjusted to 10–11 by the addition of a neutralizing agent such as a solution of sodium hydroxide. This neutralized slurry is then pumped to a treatment tank in which the pigment is coated, in a first treatment step, preferably with both the hydrous oxides of titanium and aluminum using conventional treating techniques. The amount of hydrous $TiO_2$ deposited on the pigmentary material in the first step may range from none to 1% but is preferably about 0.5% on a $TiO_2$ weight basis added as a titanyl sulfate solution; and the amount of hydrous $Al_2O_3$ may range from 1% to 4% but is preferably about 1.5% added as aluminum sulfate solution.

Following the first treatment the slurry is deliquored and washed, and the coated $TiO_2$ is calcined at a temperature sufficiently high to at least partially dehydrate the hydrous oxides. This calcination temperature may range from 450 to 800° C. but the preferred calcination temperature is about 700° C.

Following calcination the coated $TiO_2$ is milled, preferably by steam micronizing. However it is within the purview of the invention to micropulverize the coated $TiO_2$, then wet mill and finally classify the milled $TiO_2$. The milled $TiO_2$, in aqueous slurry, is then given a second coating preferably of both titania and alumina by the same procedure used in applying the first coating, after which the double-coated $TiO_2$ is deliquored, washed, dried in the normal manner and then given a final relatively intense milling as for example, by steam micronizing at a steam to pigment weight ratio of about 5:1.

While the process outlined above is preferred the invention also is comprehensive of variations within the scope of the appended claims wherein, for example, the $TiO_2$ burner discharge is wet milled and classified before being given the first coating of titania and alumina. In actual plant operations it has been the practice to operate the classifier so as to obtain an effluent containing less than 0.1% of particles larger than about 7 microns. Following the first coating step the $TiO_2$ is then dried and calcined after which it is milled by steam micronizing at a steam to pigment weight ratio of about 2:1. The milled pigment is then repulped in water and, without classification, given the second coating of titania and alumina followed by drying. Final milling of the double-coated $TiO_2$ pigment is carried out by steam micronizing at relatively high intensity as for example at a steam to pigment weight ratio of about 5:1.

Also while the preferred treatment is to precipitate both titania and alumina on the $TiO_2$ in each of two successive coating steps it is also within the purview of the invention to precipitate only one of the hydrous oxides i.e. titania or alumina in the first or the second coating step, as the case may be, preceded or followed by a coating of both titania and alumina.

As mentioned at the outset and shown by the examples below the double-coated $TiO_2$ pigment made by the process of this invention has been found to combine both exceptionally good optical properties and durability in alkyd, solution vinyls, latex and acrylic coating compositions and especially in thermosetting acrylic paints and enamels used for automobile finishes.

TESTS FOR DURABILITY

In order to demonstrate the superiority of the double-coated $TiO_2$ pigment of this invention with respect to durability of alkyd and acrylic coating compositions the double-coated $TiO_2$ of this invention was added to alkyd and acrylic vehicles. The gloss retention of these coatings in terms of D-values in weeks, was then determined according to the method described in the article entitled "Measuring and Minimizing the Variables in Evaluating Outdoor Exposure Results" by P. B. Mitton and R. L. Church appearing in Journal of Paint Technology volume 39, No. 514, pp. 635–644; 1967.

The durability of solution vinyl and acrylic latex based coating compositions pigmented with the double-coated $TiO_2$ of this invention was determined in terms of tint retention i.e. the time in weeks for the reflectance of the exposed coating to first decrease from its original value, because of dirt accumulation, and then return to the original value because of lightening resulting from chalking. This is done objectively by taking a reflectance reading of the freshly prepared coatings using a Gradner AUX–2 Reflectometer, and then taking reflectance difference readings ($\Delta$ G filter reading) at each four week internal until the reflectance readings are found to return to their original value.

TESTS FOR OPTICAL PROPERTIES

The effect of the double coated $TiO_2$ of this invention on the brightness of alkyd coating compositions was determined by dispersing the double-coated $TiO_2$ pigment in an alkyd vehicle with a Hoover Muller, drawing a thick film down on a special high-reflectance panel i.e. white ceramic panel having a green reflectance greater than 0.94, and then measuring the green, red and X-blue reflectance values of the wet film using a Colormaster Difference Colorometer (Manufactures Engineering and Equipment Corp., Hatboro, Pa.). The green reflectivity value is the measure of brightness of the pigment while the X-blue reflectivity value minus the red reflectivity value is the measure of tone.

The tint of an alkyd coating composition pigmented with the double-coated $TiO_2$ of this invention was determined by dispersing the pigment in an alkyd vehicle with a three roller mill—dividing the resulting paste into two portions, tinting one portion with a black colorant and the other portion with a green colorant. Opaque films of the tinted paints were drawn down on cardboard charts and dried overnight. The green tristimulus reflectance value (relative to the value of a standard pigment) was determined by the use of Colormaster Differential Colorometer and is proportional to the tint of the alkyd coating.

The following examples each of which is representative of a series of similar runs will serve to illustrate the invention.

Example I

Titanium dioxide as burner discharge was added to water to produce an aqueous slurry of about 25% solids. The slurry was heated to 60° C. and the pH adjusted to 10–11 by the addition of sodium hydroxide solution. To the heated slurry was added titanyl sulfate solution at about 120 g.p.l. $TiO_2$ (ratio $H_2SO_4$:$TiO_2$ about 2:1 by weight) to provide a 0.5% $TiO_2$ treatment on a $TiO_2$ weight basis. The mixture was agitated vigorously for about 30 minutes and then sodium hydroxide solution was added in an amount necessary to neutralize the titanyl sulfate, and the aluminum sulfate which was subsequently added, and to effect precipitation of the titania on the $TiO_2$. After agitating the neutralized slurry for one hour aluminum sulfate solution at about 100 g.p.l. $Al_2O_3$ was added to provide 1.5% $Al_2O_3$ on a $TiO_2$ weight basis. Additional sodium hydroxide solution was then added to adjust the pH of the slurry to 6.8–7.2. The neutralized slurry was then retained for four hours after which the slurry was washed with hot water on a rotary filter, repulped, deliquored and calcined in a rotary kiln using a maximum temperature of 700° C.

The calcined $TiO_2$ was then milled by mikropulverizing in a conventional hammer mill after which the mikropulverized material was slurried in water and wet milled in a conventional pebble mill. Following wet milling the slurry was fed to a classifier for removal of oversize particles. To this end the classifier was operated to obtain an effluent containing less than 0.1% pigment particles larger than 7 microns diameter.

Following classification, the effluent was pumped into a second treatment tank in which the coated pigment was treated with the water soluble salts of titanium and aluminum in a manner identical to that done in the first treatment tank, to provide a second coating of hydrous $TiO_2$ and hydrous $Al_2O_3$ on the pigment. Thus the total amount of hydrous $TiO_2$ and hydrous $Al_2O_3$ precipitated on the $TiO_2$ in the two coating steps was 1% and 3% respectively.

Following deposition of the second coating the pigment slurry was deliquored, washed, according to normal pigment processing procedures after which the double-coated pigment was dried by heating at 120° C. The dried pigment was then milled by steam micronizing at a steam to pigment ratio of 5:1 and ring pressure of 90 p.s.i.g.

The double-coated pigments so produced were tested for optical properties and durability using the test methods hereinabove described. The values for durability and optical properties are shown in the table below. In this connection however it should be pointed out that the figure for gloss retention in acrylics is based on durability of pigment made according to Example I but in a pilot plant rather than a plant run.

Example II

A second pigment was prepared which was substantially identical in all respects to the double-coated pigment, described in Example I except that before depositing the first coatings of titania and alumina on the titanium dioxide, the latter, in aqueous slurry, was milled in a pebble mill and then sent to a classifier for removal of the oversize particles. To this end the classifier was operated so that the effluent contained less than 0.1% pigment particles larger than 7 microns. Following deposition of the first hydrous oxide coatings and calcination of the coated $TiO_2$ the calcined $TiO_2$ was steam micronized at a steam to pigment weight ratio of about 2:1 and a ring pressure of 90 p.s.i.g. The milled $TiO_2$ was then repulped in water and given a second coating of titania and alumina in the manner hereinabove described after which the double coated $TiO_2$ was dried and then steam micronized, at a steam to pigment weight ratio of about 5:1 and a ring pressure of 90 p.s.i.g.

The double-coated $TiO_2$ pigment was then tested for optical properties and durability in alkyds and acrylic coating compositions with the results shown in the table below.

Example III

An additional pigment was made under conditions similar to that described in Example I except that in this instance both titania and alumina were deposited on the $TiO_2$ in a first coating step while only alumina was used as a coating agent in the second step. The durability and optical properties of the resulting double coated pigment are shown in the table below.

Examples IV–V

Examples IV and V are representative of another series of runs using substantially the same process steps as those described in Example I except that the $TiO_2$ was a calcined rutile $TiO_2$ produced by the sulfate process. Also in Example V the amounts of titania and alumina used in each coating step were double those used in Example I. It will be seen by reference to the table that the durability and optical properties are even better than the corresponding values of a chloride-base pigment. Moreover the double coated pigment of Experiment IV was also tested for tint retention in solution vinyl and acrylic latex compositions and was found to be superior in tint retention as well as in durability and optical properties to the $TiO_2$ pigment controls of Examples VII and VIII below.

Examples VI–VII

For purposes of comparison additional pigments were made using the double coating processes described in the Rechmann et al. patent and the South African patent identified above.

These pigments were then tested for durability, optical properties and tint retention using the tests hereinabove described. These values are shown in the table below.

It will be apparent from the data tabulated in the table that the double-coated $TiO_2$ pigments made according to the process of this invention, as exemplified by Examples I–VI, all combine both excellent durability in alkyd and acrylic vehicles and exceptionally good optical properties i.e. alkyd brightness and opacity whereas the pigments made according to the prior art may have either reasonably good durability or good optical properties but not both.

The invention thus provides a novel double-coated $TiO_2$ pigment having the unique quality of imparting superior outdoor durability together with brightness and opacity to alkyds, solution vinyls, and latex coating compositions and especially to thermosetting acrylics used in industrial automobile paints and enamels.

TABLE.—DURABILITY AND OPTICAL PROPERTIES OF DOUBLE COATED RUTILE $TiO_2$ PIGMENT

| Example | I | II | III | IV | V | VI [1] | VII [2] |
|---|---|---|---|---|---|---|---|
| $TiO_2$ Pigment | Cl-base | Cl-base | Cl-base | $SO_4$-base | $SO_4$-base | $SO_4$-base | $SO_4$-base. |
| Milling | | Pebble | | | | | |
| Classifying | | Classify | | | | | |
| 1st Stage Treatment, percent: | | | | | | | |
| $TiO_2$ | 0.5 | 0.5 | 1.0 | 1.0 | 0.5 | | 0.5. |
| $Al_2O_3$ | 1.5 | 1.5 | 1.5 | 3.0 | 1.5 | 2.1 | 1.5. |
| $SiO_2$ | | | | | | 1.8 | |
| Calcination, °C | 700 | 700 | 500 | 700 | 700 | 700 | 115. |
| Milling | Micropulverize and wet mill | Micronize 2:1 s./p. | Micronize 2:1 s./p. | Micronize 2.5:1 s./p. | Micronize 2.5:1 s./p. | Micronize 2.5:1 s./p. | Micronize 2.5:1 s./p. |
| Classifying | Classify | | | | | | |
| 2d Stage Treatment, percent: | | | | | | | |
| $TiO_2$ | 0.5 | 0.5 | | 1.0 | 0.5 | | |
| $Al_2O_3$ | 1.5 | 1.5 | 1.5 | 3.0 | 1.5 | 2.0 | .5. |
| $SiO_2$ | | | | | | 2.0 | 1.5. |
| Drying, °C | 120 | 120 | 120 | 120 | 120 | 120 | 120. |
| Milling | Micronize 5:1 s./p. | Micronize 5:1 s./p. | Micronize 5:1 s./p. | Micronize 5:1 s./p. | Micronize 5:1 s./p. | Micronize 5:1 s./p. | Micronize 5:1 s./p. |

TABLE—Continued

| Example | I | II | III | IV | V | VI [1] | VII [2] |
|---|---|---|---|---|---|---|---|
| Durability: | | | | | | | |
| Gloss retention: | | | | | | | |
| Alkyd | 29 | 29 | 27 | 33 | 34 | 33 | 28. |
| Acrylic | 76 | 76 | 79 | 80 | 78 | 70 | 57. |
| Tint retention: | | | | | | | |
| Solution vinyls | | | | 40 | | 4 | 18. |
| Acrylic latex | | | | >56 | | 56 | 31. |
| Optical Properties: | | | | | | | |
| Alkyd brightness | 96.0 | 96.1 | 96.1 | 95.4 | 95.3 | 94.3 | 95.8. |
| Alkyd tint | 1,805 | 1,825 | 1,805 | 1,803 | 1,780 | 1,680 | 1,793. |

[1] Control (Rechmann et al.). [2] Control (South African-BTP).

While this invention has been described and illustrated by the examples shown, it is not intended to be strictly limited thereto, and other variations and modifications may be employed within the scope of the following claims.

We claim:

1. Process for producing a double-metal oxide coated titanium dioxide pigment combining both superior optical properties and durability in coating compositions comprising the steps of: adding rutile titanium dioxide to an aqueous medium to form an aqueous slurry, depositing on said titanium dioxide a first coating of hydrous metal oxide of a metal selected from the group consisting of titanium, aluminum and combinations thereof by neutralizing soluble salts of said metal in said slurry to precipitate the corresponding hydrous metal oxide onto said $TiO_2$, the water soluble salt of titanium being added in amounts to precipitate from none to 1% hydrous titanium oxide and the water soluble salt of aluminum being added in amounts to precipitate from 1% to 4% hydrous aluminum oxide on a $TiO_2$ weight basis, filtering the slurry and recovering the coated $TiO_2$, calcining the coated $TiO_2$ at a temperature from 450° C. to 800° C., milling the calcined $TiO_2$, subjecting the milled $TiO_2$ to a second coating of hydrous metal oxide of a metal selected from the group consisting of titanium, aluminum and combinations thereof, said second hydrous metal oxide coating being applied to said coated $TiO_2$ in aqueous slurry in substantially the same manner and within the same amounts as said first hydrous oxide coating, and at least one of said two successive coatings comprising both the hydrous oxides of titanium and aluminum, the total amount of hydrous titanium oxide being from 0.5% to 2% and the total amount of hydrous aluminum oxide being from 2% to 8% in both of said coatings, filtering the slurry and recovering the double-coated $TiO_2$, and then drying and milling the double-coated $TiO_2$ pigment.

2. Process for producing a double-metal-oxide coated titanium dioxide pigment according to claim 1 wherein both titania and alumina are deosited on said $TiO_2$ in each successive coating step, the amount of titania in each step being from 0.5 to 1% and the amount of alumina in each step being from 1.5% to 3% on a $TiO_2$ weight basis, and said calcination temperature is about 700° C.

3. Process for producing a double-metal-oxide coated titanium dioxide pigment according to claim 1 wherein the water soluble salt of titanium is titanyl sulfate and the water soluble salt of aluminium is aluminum sulfate.

4. Process for producing a double-metal-oxide coated titanium dioxide pigment according to claim 1 wherein the calcined $TiO_2$ pigment is milled by steam micronizing at a steam to pigment ratio of about 2:1.

5. Process for producing a double-metal-oxide coated titanium dioxide pigment according to claim 1 wherein the calcined $TiO_2$ pigment is milled and classified said milling being done in two successive steps the first being dry milling and the second wet milling.

6. Process for producing a double-metal-oxide coated titanium dioxide pigment according to claim 5 wherein classification of the milled $TiO_2$ pigment is carried out in a manner to provide an effluent comprising less than 0.1% solids greater than about 7.0 microns.

7. Process for producing a double-metal-oxide coated titanium dioxide pigment combining both superior optical properties and durability in coating compositions comprising the steps of: adding a rutile titanium dioxide to an aqueous medium to form an aqueous slurry of about 25% solids, milling and classifying said slurry said classification being carried out in a manner to provide an effluent comprising less than 0.1% $TiO_2$ pigment particles greater than 7 microns, depositing on said titanium dioxide pigment a first coating of the hydrous metal oxides of titanium and aluminum by adding a water soluble salt of titanium to said slurry, adding a neutralizing agent to said slurry to precipitate said titanium salt as hydrous titanium oxide onto said pigment, adding a water soluble salt of aluminum to said slurry, said neutralizing agent being added in an amount sufficient to precipitate said aluminum salt as hydrous aluminum oxide onto said pigment, said water soluble salts being added in amounts to precipitate from none to 1% titania and 1% to 4% alumina on a $TiO_2$ weight basis, filtering the slurry and recovering the coated $TiO_2$ pigment, calcining the coated $TiO_2$ pigment at a temperature from 450 to 800° C. milling the calcined $TiO_2$ pigment by steam micronizing said pigment at a steam to pigment ratio of about 2:1, adding the milled pigment to an aqueous medium to form an aqueous slurry, subjecting the milled pigment to a second coating of the hydrous oxides of titanium and aluminum said second hydrous oxide coating being applied to said milled pigment in aqueous slurry in substantially the same manner and within the same amounts as said first hydrous oxide coating, the total amount of hydrous titanium oxide being from 0.5% to 2% and the total amount of hydrous aluminum oxide being from 2% to 8% in both of said coatings, filtering the slurry and recovering the double-coated $TiO_2$ pigment, drying the double-coated pigment by heating to a temperature of about 120° C. and then steam micronizing said dried pigment at a steam to pigment ratio of about 5:1.

8. A double-metal-oxide coated $TiO_2$ pigment combining superior optical properties and durability in coating compositions characterized by rutile $TiO_2$ pigment having two successive coatings thereon of hydrous metal oxide of a metal selected from the group consisting of titanium, aluminum and combinations thereof, at least one of said two successive coatings comprising both titania and alumina the first hydrous metal oxide coating being calcined and hence at least partially dehydrated and the second hydrous metal oxide coating being dried, each hydrous metal oxide coating comprising an amount of titania from none to 1% and an amount of alumina from 1% to 4% by weight of $TiO_2$, the total amount of hydrous titanium oxide being from 0.5% to 2% and the total amount of hydrous aluminum oxide being from 2% to 8% in both of said coatings.

9. A double metal-oxide coated $TiO_2$ pigment according to claim 8 wherein each coating consists of both titania and alumina the amount of titania in each coating being from 0.5 to 1% and the amount of alumina in each coating being from 1% to 3% by weight of $TiO_2$.

References Cited

UNITED STATES PATENTS

| | | | |
|---|---|---|---|
| 3,203,818 | 8/1965 | Rechmann | 106—300 |
| 3,251,705 | 5/1966 | Rieck et al. | 106—300 |

FOREIGN PATENTS

| | | |
|---|---|---|
| 1,008,652 | 11/1965 | Great Britain. |
| 1,022,621 | 3/1966 | Great Britain. |

TOBIAS E. LEVOW, Primary Examiner

H. M. S. SNEED, Assistant Examiner

U.S. Cl. X.R.

106—308; 241—5, 29